INVENTOR.
GEORGE McARTHUR, JR.

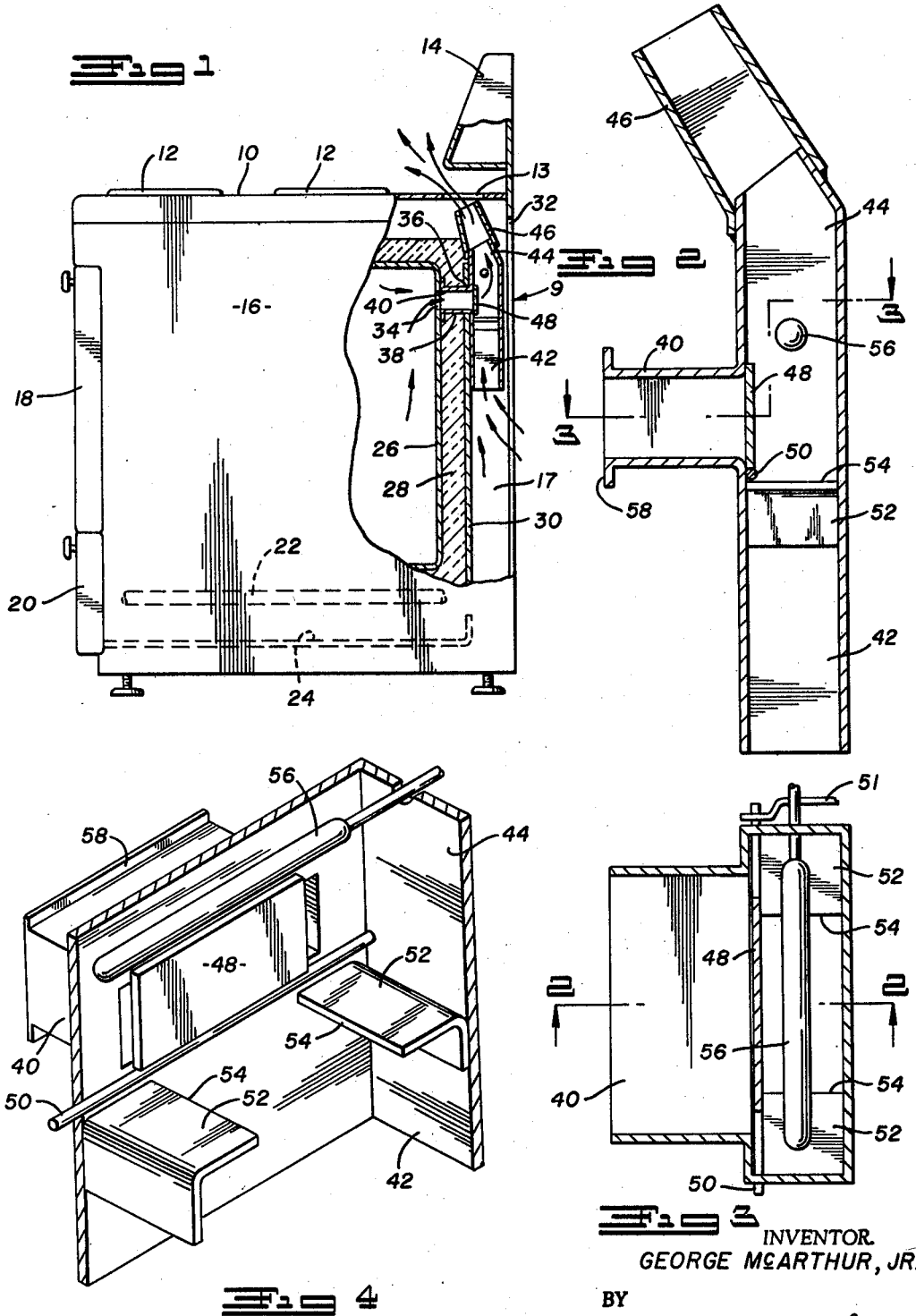

BY

*Jerome R. Cox*

ATTORNEY

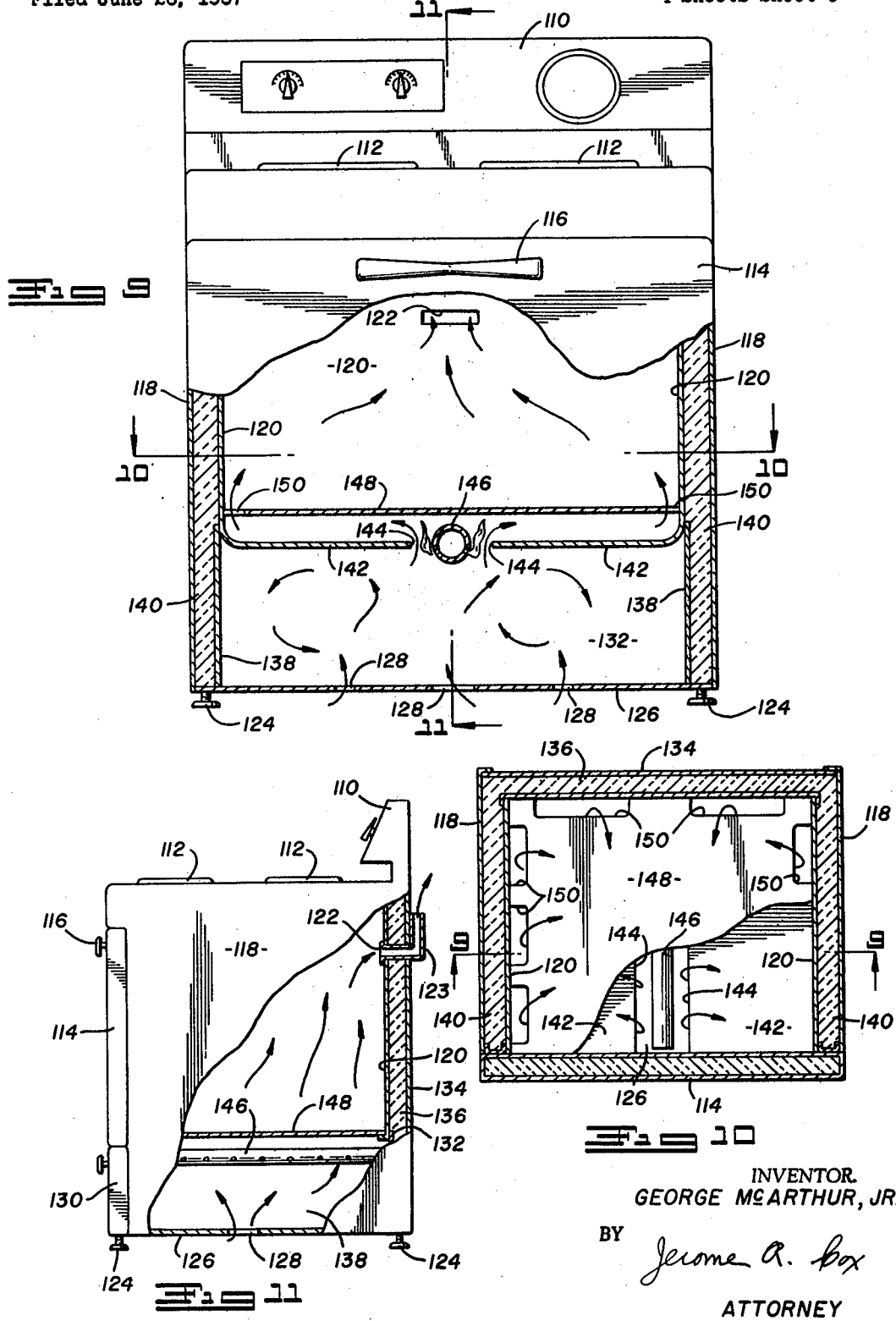

March 10, 1970  G. McARTHUR, JR  3,499,431
COOKING RANGE PREHEAT AND VENT SYSTEMS
Filed June 26, 1967  4 Sheets-Sheet 4

INVENTOR.
GEORGE McARTHUR, JR.

BY
Jerome R. Cox
ATTORNEY

United States Patent Office 3,499,431
Patented Mar. 10, 1970

3,499,431
COOKING RANGE PREHEAT AND
VENT SYSTEMS
George McArthur, Jr., Delaware, Ohio, assignor, by mesne assignments, to Glenwood Range Company, Taunton, Mass., a corporation of Massachusetts
Filed June 26, 1967, Ser. No. 648,839
Int. Cl. F24c 3/00, 15/32
U.S. Cl. 126—39          24 Claims

ABSTRACT OF THE DISCLOSURE

A preheat system is shown comprising a preheat box-like compartment in the lower part of the cooking range into which ambient air enters through holes in or near its bottom. Above this preheat compartment is an intermediate compartment separated from the preheat compartment by a heat conductive wall having an opening and a gas burner positioned in the opening spaced from the periphery of the opening. Above the intermediate compartment is an upper compartment separated from the intermediate compartment by a deflection wall with peripheral passages. Air is preheated in the preheat compartment, passes up through the opening in the heat conductive wall, sweeping the burner, turns outwardly and enters the upper compartment through the peripheral holes in the deflection wall.

A vent system is described through which the air exits from the upper compartment of the oven. It comprises a horizontally aligned hot air duct connected to the oven cavity at the rear of the oven liner, an exit stack connected to the hot air duct and extending upwardly from it, a cool air duct connected to the exit stack and extending downwardly from it, and a rotatable flat plate closure positionable alternately either for partial obstruction of air flow through the hot air duct or for complete prevention of air flow through the cool air entrance duct. A hydraulic thermostat bulb is positioned in the exit stack. At high oven temperatures, such as during heat cleaning, the draft of hot air from the oven is slowed by the obstructing closure while the hot air that does escape is mixed with cool air and then passed across the bulb. At lower temperatures, the hot air path is unobstructed and no cool air is admitted into the vent.

BACKGROUND OF THE INVENTION

This invention relates to cooking ovens and more particularly relates to cooking ovens in which provision is made for heat cleaning. More particularly, my invention relates to the control of the air entering and leaving the oven cavity and the measurement of the temperature of that air.

Conventionally, the air entering an oven cavity gains substantially all of its heat directly from contact with a burning fuel or an electrically heated resistance immediately prior to entry into the oven cavity. In a gas range, the entering cool ambient air directly enters the compartment in which the burner is located. There is a need for a system which provides for a preliminary heating of the entering air before it sweeps the burner. A higher temperature may be obtained by sweeping previously heated air past the burner.

For the exit of air and other fluids from the oven cavity, a vent is usually provided at the rear of the oven liner. However, at high oven temperatures, especially at heat cleaning temperatures, the draft through such a vent becomes undesirably rapid. This results in excessive heat loss from the oven cavity and in an outlet of air which may be so hot as to be harmful to human beings. Therefore, there is a need for an oven vent which reduces the excessive heat loss from the oven and which reduces the danger from the exit of extremely hot air from the oven.

Furthermore, there is a great need, as evidenced by the number of patents in the field, for a way of protecting a hydraulic thermostat bulb from temperatures much above 550° F. and yet simultaneously using such a bulb for temperature control of an oven having temperatures above that temperature.

It is, therefore, an object of my invention to provide improved oven air temperature and flow control.

A further object is to provide an apparatus for the preheating of air entering a cooking oven.

A further object of my invention is to provide an apparatus for the preheating of air in a structure which does not necessarily require an additional burner and which allows conventional use of a cooking range for broiling as well as for baking.

A further object of my invention is to reduce the draft of hot air from an oven at high temperatures.

A further object of my invention is to mix the exhausting hot air of an oven with cool ambient air before it exits into the ambient air.

A further object of my invention is to provide an apparatus and method for using a hydraulic thermostat bulb for temperature control of an oven at oven temperatures normally causing the failure of such bulbs.

A still further object of my invention is to provide a vent capable of reducing hot air draft, mixing cool air with hot air, housing a hydraulic thermostat bulb, and having a single moving valve which controls both hot and cool air.

Further objects and features of my invention will be apparent from the following part of this specification and claims when considered in connection with the accompanying drawings illustrating several embodiments of my invention.

SUMMARY OF THE INVENTION

I have found that the foregoing and other objects may be attained in an oven vent for venting fluids from an oven cavity comprising a hot air duct communicating with the oven cavity, an exit stack intersecting the hot air duct and extending generally upwardly from it, and a movable closure positionable in at least two positions. One position is for partially obstructing the flow of fluids through the hot air duct and the other position for not obstructing the flow. The objects are better attained if a cool air entrance duct is provided which intersects (i.e. communicates with, connects with, or meets) the fluid path running through the hot air duct and the exit stack and extends generally downwardly from the exit stack. The objects are even better attained if the closure controls both the cool air entrance duct flow and the hot air duct flow so that when the hot air duct is obstructed the cool air entrance duct is unobstructed, and when the hot air duct is unobstructed the cool air duct is obstructed. When this is done, a hydraulic thermostat bulb may be positioned and operated in the exit stack at very high temperatures.

Further attainment of these objects is accomplished in an apparatus for heating the air entering the oven cavity of a cooking range comprising: a preheat compartment positioned in the lower portion of a cooking range which has at least one ambient air entrance port; an intermediate compartment positioned above the preheat compartment; a heat conductive wall separating the preheat compartment from the intermediate compartment, this wall having an opening in it; a burner positioned in this opening which is spaced from the periphery of the opening; an upper compartment positioned above said intermediate compartment; and an air deflection wall separating the intermediate compartment from the upper compartment and having at least one passage through it.

BRIEF DESCRIPTION OF THE DRAWINGS

FIG. 1 is a view in side elevation of a cooking range but with parts broken away and parts in vertical section showing the positioning of a vent constructed according to my invention.

FIG. 2 is a vertical sectional view of a preferred embodiment of my invention taken substantially along the line 2—2 of FIG. 3.

FIG. 3 is a view in horizontal section of a preferred embodiment of my invention taken substantially along the line 3—3 of FIG. 2.

FIG. 4 is a sectional view of a preferred embodiment of my invention, in perspective, showing its hot air entrance duct partially obstructed.

FIG. 9 is a view in vertical section of a cooking range having a preheat compartment constructed according to my invention and taken substantially along the line 9—9 of FIG. 10.

FIG. 10 is a view in horizontal section taken substantially along the line 10—10 of FIG. 9 looking in the direction of the arrows and showing the baffles of a preheater constructed according to my invention.

FIG. 11 is a view in side elevation and in partial section taken substantially along the line 11—11 in FIG. 9 showing a cooking range constructed according to my invention.

Figure 5:
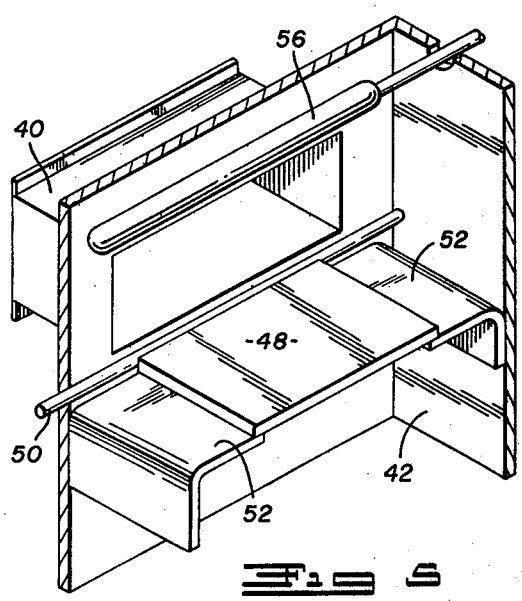
FIG. 5 is a sectional view in perspective of the same embodiment of my invention as shown in FIG. 4, showing the hot air entrance duct unobstructed and the cool air entrance duct completely obstructed.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DESCRIPTION OF THE PREFERRED EMBODIMENTS

Vent structure

FIG. 1 shows a cooking range with a portion removed to illustrate the preferred location of an oven vent indicated generally by 9 which embodies my invention.

The range generally comprises a top 10 having burners 12 thereon and an opening 13 through its rear portion, a control panel 14 at the upper rear of the range, a range body of which two opposite sides 16 and 17 are shown in FIG. 1, an oven door 18, and a broiler door 20. An outline of a gas burner 22 is shown in phantom to indicate its position in the lower part of the range below the oven. The position of the broiler tray 24 near the bottom of the range is also indicated in phantom.

An oven liner 26 is fixed within the range to define an oven cavity and is surrounded by insulation 28. The rear of the range is enclosed by a back panel 30. The sides 16 and 18, like the top 10, extend more rearward than the back panel 30. They are flanged at their rearmost edge to form a rear flange 32.

The oven liner 26 has a hole 34, the rear panel 30 has a hole 36, and the insulation 28 has a passageway 38. All three openings are aligned at the upper, central, rear portion of the oven liner 26, to form a passageway for a hot air duct 40.

FIGURES 2, 3, and 4 show in greater detail the vent shown in FIG. 1. The same numerals are used in all four views to indicate like parts.

Referring now to FIGURES 1, 2, 3, and 4, I will describe a preferred embodiment of my invention.

The preferred embodiment comprises in a selected operative position the horizontally aligned hot air duct 40, a vertically aligned exit stack 44 extending upwardly from the hot air duct 40, and a vertically aligned cool air entrance duct 42 extending downwardly from the exit stack. A deflecting extension 46 is attached as part of the vent to form the upper portion of the exit stack 44. While many types of duct, conduit, or passageway structure for directing fluid flow could be used to embody my invention, I prefer and show ducts of rectangular cross section made and formed of metal sheet.

Where the hot air duct 40 and the cool air entrance duct 42 intersect the exit stack 44, a rotatable closure 48 is provided which rotates with and is fixed to an axle axle 50. The closure 48 shown is a rectangular flat plate. The axle 50 extends through holes in the cool air entrance duct, which holes serve as bearings. A control lever 51 is fixed to the axle 50 for attachment of a motive device such as a solenoid (not shown).

The closure 48 or any other closure used in my invention must be movable. It must be movable to a position in which it partially obstructs the flow of fluid along the fluid path running from the oven into and through the hot air duct and out of the exit stack. The movable closure must also be positionable so that it does not obstruct this fluid flow. Thus the closure must be positionable in at least these two alternate positions.

A pair of baffles 52 are positioned in the cool air entrance duct 42 immediately below its intersection with the exit stack 44. The baffles 52, illustrated in FIGS. 1, 2, 3, 4, and 5 extend the full width of the cool air entrance duct 42 but extend only a sufficient distance along its breadth so that the opening between their edges 54 is no greater than and approximately equal to the length of the closure 48.

A thermostat sensing means, such as the liquid thermostat bulb 56, may be positioned in the exit stack 44 according to the principles discussed below.

The whole vent assembly is attached by conventional means so that the hot air duct 40 is within the hole 36 in the rear panel 30 and within the passageway 38 through the insulation. A flange 58 at the end of the hot air duct 40 butts against the oven liner 26 at the hole 34 through the oven liner.

FIG. 5 is a view of the same embodiment shown in FIG. 4 except that the closure 48 is shown rotated to its horizontal position where it will not obstruct the fluid path through the hot air duct 40 but will completely block the fluid path through the cool air entrance duct 42.

I prefer that a movable closure used in my invention not only have the two alternate positions described above, but that the position for unobstructed flow through the hot air duct simultaneously serve as a position in which the cool air entrance duct is closed.

I prefer, therefore, to use as a movable closure a rotatable flat plate which rotates through a selected arc. In the preferred embodiment of FIGS. 1–5, this arc is 90°. In FIG. 4, the closure is at the terminus of the arc at which it partially obstructs the flow through the hot air duct. One surface of the plate becomes co-planar with the intersection of the hot air duct with the exit stack. In FIG. 5, the closure is shown at the other terminus of the arc where the other surface of the closure obstructs and completely blocks the fluid flow through the cool air entrance duct.

Figure 6:
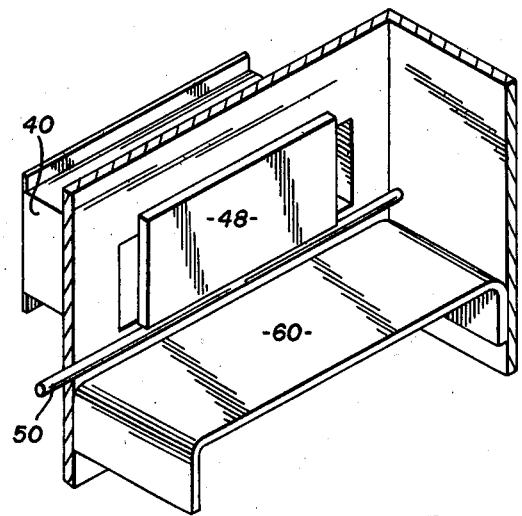
FIG. 6 is a sectional view in perspective of another embodiment of my invention, having the cool air entrance duct completely and permanently obstructed.

FIG. 6 is an embodiment wherein there is no provision for the entrance of cool air into the vent. A bottom panel 60 permanently encloses the bottom of the vent. The closure 48 is shown obstructing the hot air duct 40.

Figure 7:
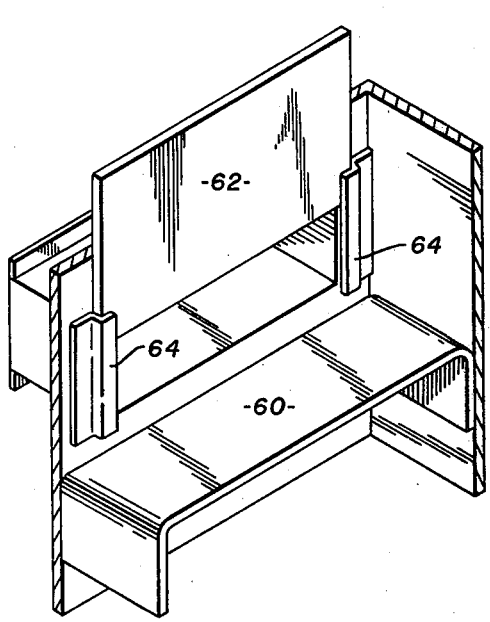
FIG. 7 is a sectional view in perspective of an alternate embodiment of my invention showing another type of movable closure.

FIG. 7 shows an embodiment like that shown in FIG. 6 except that it is provided with a different closure 62 The closure 62 is a planar panel which slides (vertically as illustrated) in the guides 64.

Figure 8:
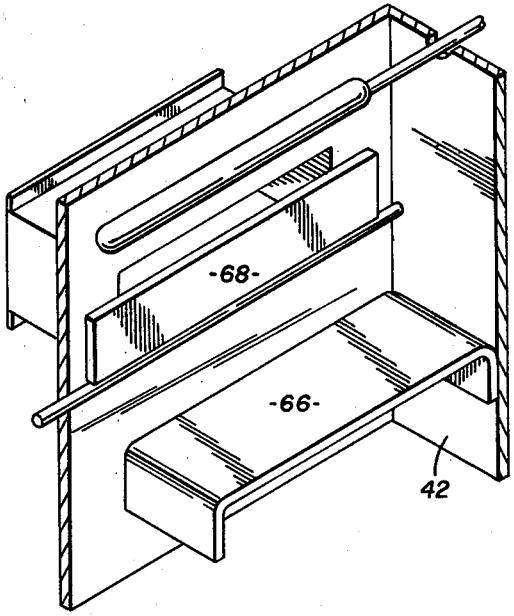
FIG. 8 is a sectional view in perspective of an alternate embodiment of my invention showing another type of movable closure.

The embodiment of FIG. 8, like the embodiments shown in FIGS. 1–5, provides for the entrance of cool air through a cool air entrance duct 42. A baffle 66 extends the breadth of the cool air entrance duct but extends along only part of its width. The width of the opening remaining is less than and approximately equal to the width of the rotatable closure 68. The length of the opening, like the length of the closure 68, is approximately equal to the breadth of the cool air entrance duct 42.

Thus, in the embodiments in FIGS. 1–5 and 8, the dimensions of the movable closure become very important. It must have dimensions which enable it to only partially obstruct fluid flow through the hot air duct but enable it to completely obstruct flow through the cool air entrance duct. It must have one dimension which is smaller than the corresponding dimension of the intersection of the hot air duct with the exit stack. So, for example, the intersection in FIG. 5 might be six inches long and the movable closure 48 four inches long; or the intersection in FIG. 8 might be 2 inches wide while the closure 68 is 1½ inches wide.

Whatever size the movable closure is, it must, in the embodiments I prefer, cooperate alternately with the cool air entrance duct and the hot air entrance duct.

In FIG. 5, the baffling 52 provides an opening substantially equal to the size and shape of the closure 48. The baffling in FIG. 8 provides an opening appropriate for the closure 68.

Not only are other combinations of closures and baffling obvious, but also other structures could be used. For example, the whole cool air entrance duct could have a cross section of the same size and shape as the movable closure and smaller than the cross section of the hot air entrance duct. Thus baffles would be unnecessary.

Furthermore, the position for partial obstruction of the flow through the hot air duct could be a position wherein a closure the same size or larger than the intersection of the hot air duct with the exit stack is spaced from that intersection when positioned for partial obstruction of the fluid path through the hot air duct. It would be possible, though not preferable, to design a closure having two separate movable bodies, one for obstruction of the hot air duct and the other for obstruction of the cool air entrance duct. They could be mechanically or electrically linked to operate in a manner equivalent to the closures I have described.

Vent operation

When a vent with a single fluid path is used, such as the embodiments of FIGS. 6 and 7, its function is easily understood.

At the lower oven cooking temperatures (e.g. below 400°), the closure does not obstruct the flow of fluid from within the oven.

But, when higher temperatures are obtained, especially temperatures used for heat cleaning purposes, the velocity of flow through the vent increases with a consequent increased loss of heat.

When the oven temperature rises above a preselected temperature (e.g. 400°), the closure is moved to a position for obstruction of fluid flow from the oven. This reduces flow velocity and conserves heat.

When an embodiment like that shown in FIGS. 1–5 is used, further results are obtained. Below the preselected temperature, this embodiment allows unobstructed flow of fluid from the oven.

However, when the oven temperature rises above the preselected temperature, the movable closure not only conserves heat by obstructing fluid flow the oven but also it allows the mixing of cool air with the hot fluid from the oven. The mixing serves two purposes. First, it prevents the escape of dangerously hot fluid from the oven. Second, it allows use of a hydraulic thermostat bulb without danger of injury to the bulb.

Hydraulic thermostat bulbs are commonly used with temperatures below 550° F. They are subject to inaccuracy or destruction at a higher temperature. My invention provides a way of using the same hydraulic bulb for thermostat purposes for both cooking and heat cleaning.

By mixing the hot fluid from the oven with cool ambient air during heat cleaning, the bulb temperature may be kept below 600°. However, the bulb temperature will always be proportional to the oven temperature because the oven temperature will be proportional to the temperature of the mixed hot fluid and cool ambient air. Thus the thermostat control system of the cooking range will be designed to have two modes of operation. The first mode will be one in which the closure is positioned for unobstructed fluid flow through the hot air duct and in which the hydraulic thermostat bulb senses the approximate true temperature of the fluid within the oven cavity. The second mode will be one in which the closure is positioned to obstruct the fluid flow through the hot air duct and to permit passage of cool air through the cool air entrance duct. The hot fluid from the oven cavity and the cool ambient air mix and sweep the thermostat bulb so that the bulb senses a temperature proportional to the temperature of the oven. In this second mode, the thermostat control system is calibrated to react to the actual temperature in the oven cavity.

Preheat baffling structure

FIGURES 9, 10 and 11 show a cooking range, either gas or combination gas and electric, which has a control panel 110, burners 112, and an oven door 114 having a handle 116 thereon.

A portion of the range is removed in FIG. 9 which exposes outer side panels 118. Mounted centrally within the range is an oven liner 120 which almost completely surrounds and defines the oven cooking area on all six sides. An opening 122 through the upper rear portion of the oven liner 120 leads to an oven vent 123. The range is equipped with four adjustable support feet 124 near its bottom four corners.

The preheat compartment of this embodiment of my invention is in the lower part of the range and is defined at its bottom by a bottom panel 126 which may have one or more air entrance ports 128 through it. Alternatively, air entrance ports may be provided through a wall or through the rear of the preheat compartment. As another design alternative, the bottom panel may be, and preferably is, insulated as described below. The front of the preheat compartment is defined by the inner surface of the broil door 130 (see FIG. 11) and the rear is defined by an inner rear panel 132 which is separated from an outer rear panel 134 by insulation 136. The sides of the preheat compartment are defined by two inner side panels 138 which are separated from the outer side panels 118 by insulation 140.

The bottom portion of the oven liner 120 extends horizontally to form a heat conductive wall comprising two baffles 142 which define the top of the preheat compartment. The inner edges 144 of the baffles 142 form a slot along which a linear gas burner 146 is positioned.

While this embodiment shows a slot with a linear gas burner, other types of openings and burners are possible. For example, the opening could be circular with a circular burner in it. There could be a series of slots with a series of burners.

It is desirable that the burners be spaced from the periphery of the opening whatever shape it is. While there is no critical distance, it is desirable that the flame from a gas burner be wholly in the air and not touch the heat conductive baffles 142.

Spaced above the gas burner 146 is a deflection wall 148 which extends to the oven liner 120 walls but which has a plurality of passages 150 peripherally through it. An intermediate compartment is formed between the heat conductive wall comprising baffles 142 and the deflection wall 148. Above the intermediate compartment is an upper compartment separated from it by the deflection wall 148. This upper compartment is the usual place for food baking.

In the preferred embodiment, the intermediate compartment and the upper compartment are within the oven liner. However, this is not necessary. This apparatus could be constructed with only the upper compartment within the oven liner or, though not preferred, with all three compartments enclosed by the oven liner.

A portion of the deflection wall 148 is shown removed in FIG. 10 to expose the underlying heat conductive wall formed by baffles 142, and to additionally show the baffle edges 144, and the gas burner 146 positioned along the opening between the baffle edges 144.

Figure 12:
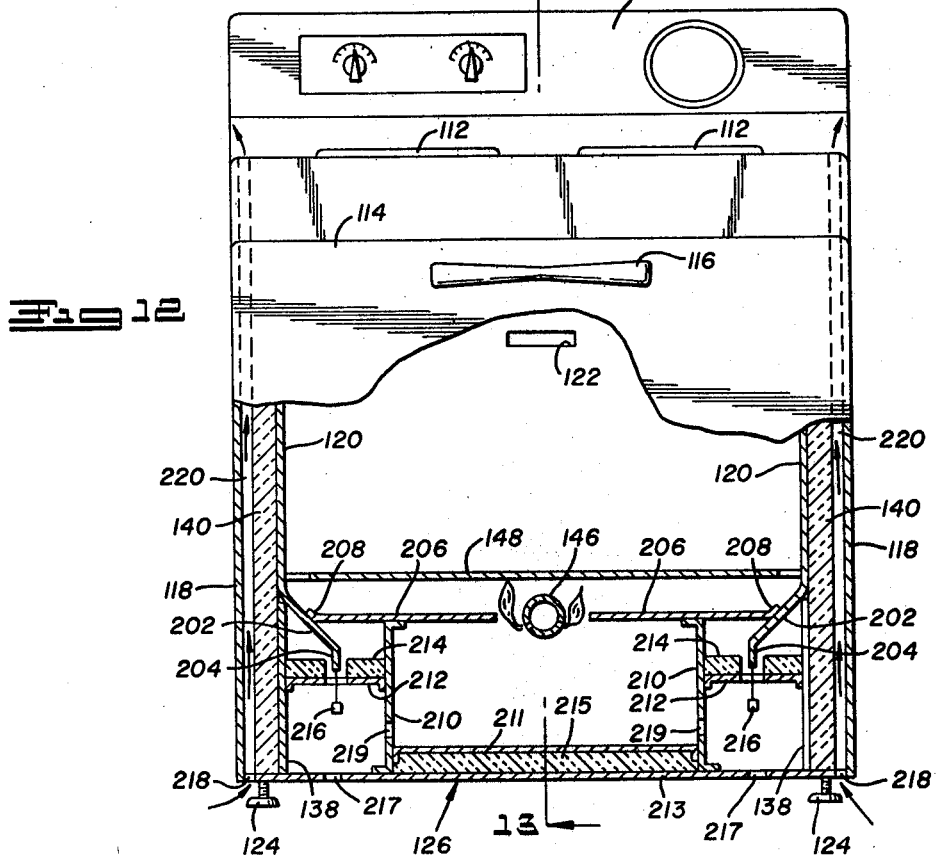
FIG. 12 is a view in front elevation and in partial section of a cooking range having a preheat compartment constructed with an alternate and preferred embodiment of my invention.

FIG. 12 illustrates another embodiment of my invention. In this embodiment, the bottom extension of the oven liner 120, instead of being horizontally aligned to form baffles, has short, oblique flanges 202 downwardly and inwardly inclined which have vertical lips 204 at their lowermost edge.

The oven liner bottom comprises two baffles 206 which, when in position in the range, have oblique flanges 208 which are upwardly and outwardly inclined and which are fixed to the oblique flanges 202 on the oven liner 120.

A pair of vertical partitions 210 form the side walls of the preheat compartment and extend from the baffles 206 to the range bottom panel 126. The front and rear walls of the preheat compartment are constructed as illustrated in FIGS. 9, 10, and 11.

A horizontal divider 212 connects each of the inner side panels 138 with the vertical partitions 210. Insulation 214 rests on the dividers 212. Electrical wiring may be fed through the two compartments above and below the horizontal dividers 212. Electrical terminals 216 are shown in the lower compartments.

The bottom panel, indicated generally by 126, is shown to comprise two metal sheets 211 and 213 with insulation 215 between them. I prefer to use insulation because it improves the heat retention in the preheat compartment and therefore aids the transfer of heat to the incoming air. Air entrance ports could be provided through the bottom panel 126 shown in FIG. 12. However, air entrance ports could also be provided through a wall or between the broiler door and the frame, as shown and described with FIG. 13. As still another alternative, air entrance ports 217 could be provided through the bottom metal sheet 211 with cooperating air entrance ports 219 through the vertical portions 210. These alternative air entrance port systems are not confined to use with the embodiment shown in FIG. 12 but may be used in many embodiments of my invention.

In the embodiment of FIG. 12, I additionally provide air cooling between the outer range panels and the range insulation whenever practical. At the bottom of the range adjacent to the sides 118, I have provided air intake ports 218. Air spaces 220 are provided between the insulation 140 and the side panels 118 through which cool ambient air may circulate by convection and pass out the top of the range through suitable outlets. This maintains the range at a safe temperature.

A further modification may be provided in an embodiment of my invention. I have found it advantageous to provide a passageway or several passageways adjacent to but outside of the oven liner. Such a passageway communicates with the preheat compartment, the intermediate compartment or both.

The passageways are constructed so that hot air not only contacts the inner surface of the oven liner but also contacts at least a portion of its outer surface. I have found this structure particularly useful for heating a liner to a heat cleaning temperature.

Figure 13:
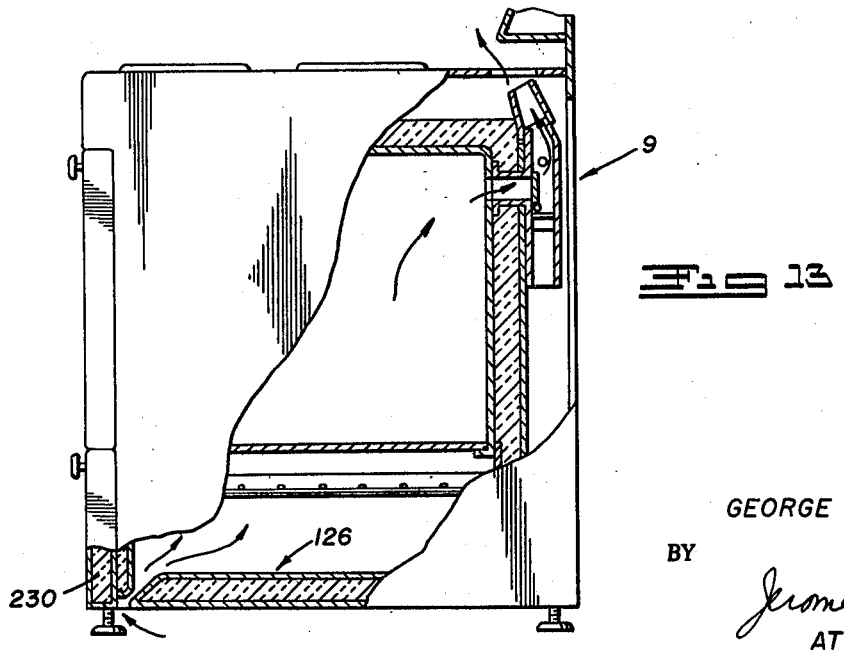
FIG. 13 is a view in side elevation with a partial vertical section of a cooking range having a vent and preheat compartment constructed according to my invention and taken substantially along the line 13—13 in FIG. 12.

In the embodiment of FIG. 13, I show a vent 9 positioned in a cooking range similarly to the vent 9 shown in FIG. 1. The cooking range of FIG. 13 also has the preheating system. I prefer to combine these embodiments of my invention in a single heat cleaning cooking range. By simultaneously preheating the air entering the oven and controlling the flow of heated air from the oven, I am able to obtain temperatures substantially higher than would be possible by only preheating or by only controlling the heated air flow.

Furthermore, when my preheating system is used and higher temperatures are thereby attained, the improved results obtainable from my vent are made even more desirable.

Also in FIG. 13, I show another type of air entrance port. The air entrance port is provided by a gap between the boiler door 230 and the insulated bottom panel 126. This gap could be designed to be a single long space or a series of short spaces. Alternatively, passageways could be provided through the broiler door to provide air entrance ports. There are, therefore, many types of air entrance ports which may be used with my invention.

Preheat baffling operation

If the temperature of air is raised before it sweeps the burner, then higher temperatures are obtainable in the air as it sweeps the burner.

Referring to FIG. 9, ambient air enters the preheat compartment through the air ports 128 in the range bottom. While circulating through this compartment, the air receives heat from the walls of the preheat compartment, especially the heat conductive top wall 142, and directly from the burner 146. Because the sides of the preheat compartment are surrounded by insulation 140, less heat is lost and more heat is acquired by the air in the preheat compartment.

The air, after being heated in the preheat compartment, sweeps past the burner and through the opening in the heat conductive wall separating the preheat compartment from the intermediate compartment. The air becomes considerably hotter, is directed outwardly, and passes through the peripheral passages 150 into the upper compartment.

The air, when it arrives in the upper compartment, is hotter than it would be possible if it had not been preheated. While this result is desirable when using the oven for cooking, it is even more beneficial when heat cleaning the oven.

It is to be understood that while the detailed drawings and specific examples given describe preferred embodiments of my invention, they are for the purposes of illustration only, that the apparatus of the invention is not limited to the precise details and conditions disclosed, and that various changes may be made therein without departing from the spirit of the invention which is defined by the following claims.

I claim:
1. An oven vent for venting air and other fluids from an oven cavity, comprising
   (1) a hot air duct communicating with said oven cavity;
   (2) an exit stack communicating with said hot air duct and extending upwardly from said hot air duct;

(3) a movable closure positionable as a partial obstruction of the flow of fluids through said hot air duct and out said exit stack and positionable for unobstructed flow of fluids through said hot air duct and out of said exit duct; and (4) a cool air entrance duct which communicates with the fluid path through said hot air duct and said exit stack and in operative position extends downwardly from said exit stack.

2. A vent according to claim 1 wherein a thermostat temperature sensor is positioned in said exit stack and connected to control means for controlling the temperature in the oven cavity.

3. A vent according to claim 1 wherein there is provided means alternatively positionable for obstructing or not obstructing said cool air entrance duct.

4. A vent according to claim 3, wherein said movable closure is alternatively positionable for obstruction of said cool air entrance duct and partial obstruction of said hot air duct.

5. A vent according to claim 4 wherein a hydraulic thermostat bulb is positioned in said exit stack and connected to a control means for controlling the temperature in the oven cavity.

6. A vent according to claim 4 wherein said movable closure comprises a body mounted for rotation through a selected arc, positionable at one terminus of said arc as a partial obstruction of said hot air duct, and positionable at the other terminus of said arc for obstruction of said cool air entrance duct.

7. A vent according to claim 6 wherein said cool air entrance duct has a substantially rectangular cross section, said hot air duct has a subbstantially rectangular cross section, and said movable closure is a flat plate.

8. A vent according to claim 1, wherein
(1) said hot air duct has a substantially rectangular cross section;
(2) said exit stack has a substantially rectangular cross section and has a rectangular planar connection with said hot air duct;
(3) said cool air entrance duct has a substantially rectangular cross section and has a substantially rectangular, planar, connection with said exit stack;
(4) said movable closure is a flat plate, rotatably positioned in said exit stack for rotation about a selected arc, having a first surface positionable in the plane of the connection of said hot air duct and said exit stack at one terminus of said arc, having a second surface positionable in the plane of the connection of said cool air entrance duct and said exit stack at the other terminus of said arc;

wherein said movable closure is rotatable to alternately obstruct the fluid flow through said cool air entrance duct and to partially obstruct the fluid flow through said hot air duct.

9. A vent according to claim 8 wherein a temperature sensing hydraulic thermostat bulb is positioned in said exit stack and connected to a control means for controlling the temperature of the oven cavity.

10. A vent according to claim 8 wherein said movable closure has at least one dimension which is smaller than the corresponding dimension of the intersection of said hot air duct and said exit stack.

11. A method for detecting the temperature of an oven by means of a thermostat of the type using a hydraulic thermostat bulb as a sensing means in communication with an expandable chamber for the method comprising the steps of:
(1) mixing the hot fluid in said oven cavity with cool ambient air by effecting their flow into a single passageway; and
(2) passing said mixture over said bulb;
wherein the expansion of said thermostat chamber is proportional to the temperature of the fluid in said oven.

12. An apparatus for heating the air entering the oven cavity of a cooking range, comprising
(1) a preheat compartment positioned in the lower portion of said range having at least one ambient air entrance port;
(2) an intermediate compartment positioned above said preheat compartment;
(3) a heat conductive wall separating said preheat compartment from said intermediate compartment, said wall having an opening therethrough;
(4) a burner positioned in said opening spaced from the periphery of said opening;
(5) an upper compartment positioned above said intermediate compartment; and
(6) an air deflection wall separating said intermediate compartment from said upper compartment and having at least one passage therethrough;
wherein, by convection, ambient air enters said preheat compartment through at least one ambient air port and is therein preheated at least partially by heat from said heat conductive wall and directly from said burner,
wherein said air flows through the opening in said heat conductive wall, sweeping said burner, and into said intermediate compartment, and wherein said air flows outwardly within said intermediate compartment and up into said upper compartment through at least one passage in said air deflection wall.

13. An apparatus according to claim 12 wherein said opening is a linear slot and wherein said burner is a linear gas burner.

14. An apparatus according to claim 12 wherein the sides and bottom of said preheat compartment are insulated from the ambient air.

15. An apparatus according to claim 12 wherein said air deflection wall has a plurality of passages through its periphery.

16. An apparatus according to claim 12 wherein said opening is circular and said burner is a circular gas burner.

17. An apparatus according to claim 12 wherein
(1) said opening through said heat conductive wall is a linear slot;
(2) said burner is a linear gas burner;
(3) the sides of said preheat compartment are insulated from the ambient air; and
(4) said air deflection wall has a plurality of passages through its periphery.

18. An apparatus according to claim 17 wherein said heat conductive wall is a horizontal extension of an oven liner defining said oven cavity.

19. An apparatus according to claim 12 wherein at least one passage is provided adjacent to the exterior of the oven liner communicating with at least one of said compartments for the flow therethrough of heated air.

20. An improved cooking range of the type having an outer body wherein the improvement comprises:
(a) a preheat compartment positioned in the lower portion of said body having at least one ambient air entrance port;
(b) an intermediate compartment positioned in said body above said preheat compartment;
(c) a heat conductive wall separating said preheat compartment from said intermediate compartment, said wall having an opening therethrough;
(d) a burner positioned in said opening spaced from the periphery of said opening;
(e) an upper compartment positioned in said body above said intermediate compartment;
(f) an air deflection wall separating said intermediate compartment from said upper compartment and having at least one passage therethrough;
(g) a hot air duct communicating with said upper compartment;
(h) an exit stack intersecting said hot air duct; and
(i) a movable closure positionable as a partial obstruction of the flow of air out of said upper compartment through said hot air entrance duct and out said exit stack and positionable for unobstructed flow of said fluid out of said upper compartment through said hot air duct and out said exit stack.

21. A range according to claim 20 wherein a cool air entrance duct is provided which intersects the fluid path through said hot air duct and said exit stack and in a selected position extends downwardly from said hot air duct.

22. A range according to claim 21 wherein a hydraulic thermostat bulb is positioned in said exit stack.

23. A range according to claim 21 wherein said movable closure comprises a body mounted for rotation through a selected arc, positionable at one terminus of said arc as a partial obstruction of said hot air duct, and positionable at the other terminus of said arc for restriction of said cool air entrance duct.

24. A method for use in a gas oven of the type having an oven liner provided with a hot gas inlet opening, a gas burner positioned beneath the inlet opening, and a vent communicating with the oven liner so that burning gases at the burner induce a convection flow through the oven liner and out of the vent, the method comprising:

partially obstructing the flow of convection gases through said vent when the oven reaches a preselected temperature while maintaining a substantial flow through said vent.

References Cited

UNITED STATES PATENTS

| | | |
|---|---|---|
| 2,586,023 | 2/1952 | Gillette. |
| 2,638,893 | 5/1953 | O'Keefe _____ 126—21 X |
| 2,743,719 | 5/1956 | Reeves _____ 126—21 |
| 3,148,674 | 9/1964 | Boardman et al. _____ 126—19 |
| 3,364,912 | 1/1968 | Dills et al. |
| 1,169,694 | 1/1916 | Swisher _____ 126—21 |
| 2,140,681 | 12/1938 | Schneider et al. ____ 126—19 X |
| 2,259,639 | 10/1941 | Hennessy. |
| 2,488,388 | 11/1949 | Evans. |
| 2,839,044 | 6/1958 | Phares _____ 126—19 X |
| 3,027,444 | 3/1962 | Weeks _____ 126—21 X |

FOREIGN PATENTS

| | | |
|---|---|---|
| 957,534 | 8/1949 | France. |

CHARLES J. MYHRE, Primary Examiner

U.S. Cl. X.R.

126—21